(12) United States Patent
Inoue

(10) Patent No.: US 6,734,918 B2
(45) Date of Patent: May 11, 2004

(54) DATA SLICER CIRCUIT

(75) Inventor: Tetsuhiko Inoue, Hyogo (JP)

(73) Assignees: Mitsubishi Denki Kabushiki Kaisha, Tokyo (JP); Mitsubishi Electric System LSI Design Corporation, Itami (JP)

( * ) Notice: Subject to any disclaimer, the term of this patent is extended or adjusted under 35 U.S.C. 154(b) by 441 days.

(21) Appl. No.: 09/918,798

(22) Filed: Aug. 1, 2001

(65) Prior Publication Data

US 2002/0140856 A1 Oct. 3, 2002

(30) Foreign Application Priority Data

Apr. 3, 2001 (JP) ........................... 2001-104562

(51) Int. Cl.[7] ............... H04N 7/08; H04L 25/06; G11C 27/02
(52) U.S. Cl. ............... 348/465; 348/468; 327/94; 375/340
(58) Field of Search .................. 348/465, 468, 348/461, 473, 478, 467, 476, 474, 464; 375/340, 316; 370/535, 475; 327/91, 94, 63

(56) References Cited

U.S. PATENT DOCUMENTS

| | | | | |
|---|---|---|---|---|
| 4,115,811 A | * | 9/1978 | Goff ........................... 348/622 |
| 4,358,790 A | * | 11/1982 | Summers ..................... 348/465 |
| 4,613,900 A | * | 9/1986 | Matsunaga et al. ......... 380/239 |
| 4,667,235 A | * | 5/1987 | Nozoe et al. ................ 348/464 |
| 5,304,866 A | * | 4/1994 | Uranaka ....................... 327/63 |
| 5,371,545 A | * | 12/1994 | Tults ........................... 348/465 |
| 5,404,172 A | * | 4/1995 | Berman et al. ............. 348/465 |
| 5,412,692 A | * | 5/1995 | Uchida ........................ 375/317 |
| 5,481,212 A | * | 1/1996 | Shima ........................... 327/94 |
| 5,483,289 A | * | 1/1996 | Urade et al. ................ 348/468 |
| 5,596,372 A | * | 1/1997 | Berman et al. ............. 348/537 |
| 5,666,167 A | * | 9/1997 | Tults ........................... 348/465 |
| 5,715,011 A | * | 2/1998 | Bramwell .................... 348/465 |
| 5,744,985 A | * | 4/1998 | Nishida ......................... 327/94 |
| 5,754,250 A | * | 5/1998 | Cooper ........................ 348/525 |
| 5,760,844 A | * | 6/1998 | Jorden ......................... 348/691 |
| 5,801,555 A | * | 9/1998 | Kwon ............................ 327/94 |
| 5,831,562 A | * | 11/1998 | Van Auken et al. ........ 341/122 |
| 6,069,499 A | * | 5/2000 | Cho et al. ..................... 327/58 |
| 6,285,403 B1 | * | 9/2001 | Lee .............................. 348/465 |
| 6,292,223 B1 | * | 9/2001 | Englert ........................ 348/468 |
| 6,381,287 B1 | * | 4/2002 | Shin ............................. 375/316 |
| 2002/0106038 A1 | * | 8/2002 | Lee et al. .................... 375/340 |

FOREIGN PATENT DOCUMENTS

| | | |
|---|---|---|
| JP | 59-141886 A | 8/1984 |
| JP | 60-93891 A | 5/1985 |
| JP | 8-251560 A | 9/1996 |

* cited by examiner

Primary Examiner—Michael H. Lee
Assistant Examiner—Paulos M. Natnael
(74) Attorney, Agent, or Firm—Leydig, Voit & Mayer, Ltd.

(57) ABSTRACT

The data slicer circuit has a first capacitor that holds a pedestal potential of a video signal; a second capacitor that calculates an average potential of signals existing in a period where a clock run-in signal of the multiplex signal is present and holds the average potential; and a comparator which compares the two held potentials. The comparator outputs a detection signal indicative of the presence of the multiplex signal when the potential held by the second capacitor is higher than that held by the first capacitor.

9 Claims, 5 Drawing Sheets

FIG.5
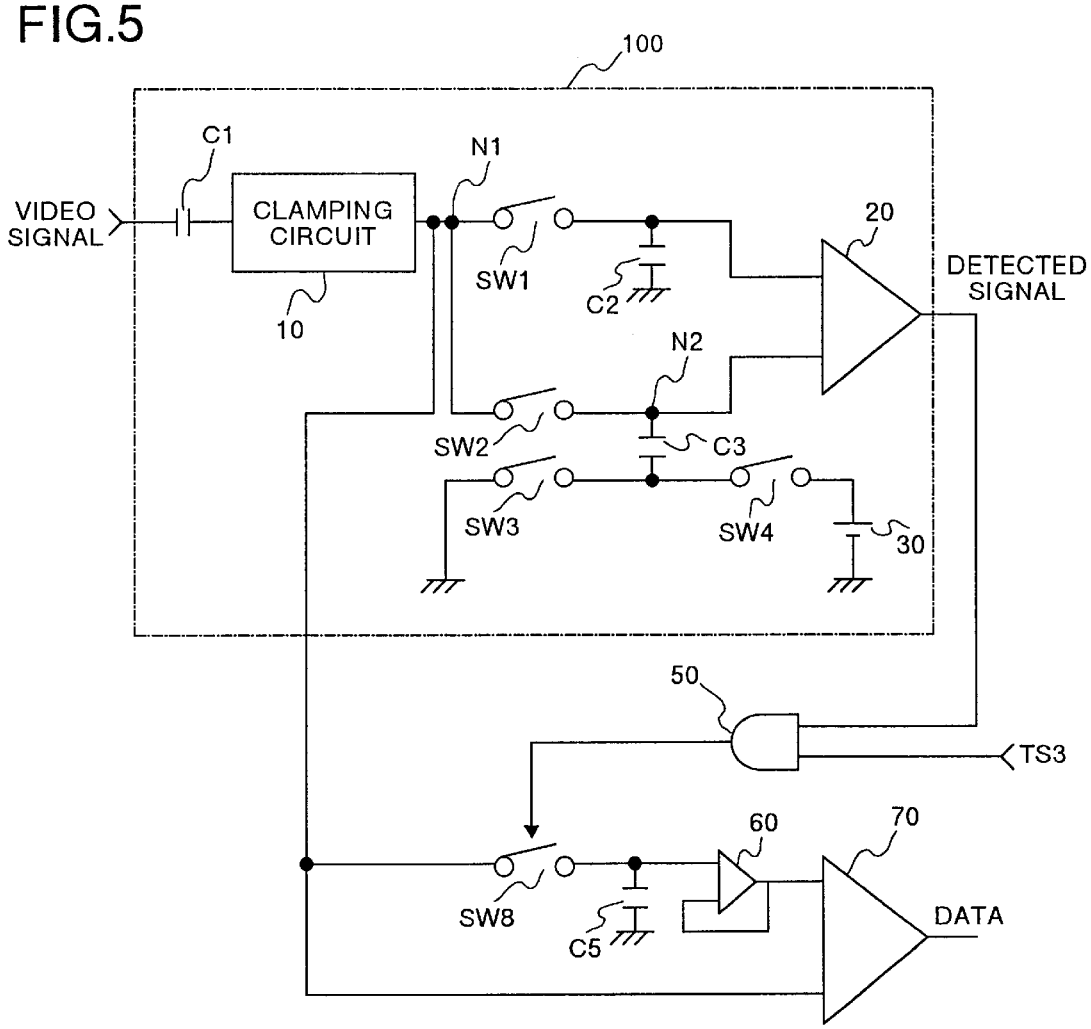
FIG.6A VIDEO SIGNAL
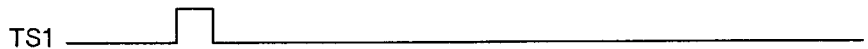
FIG.6B  TS1
FIG.6C  TS2
FIG.6D  TS3

DATA SLICER CIRCUIT

FIELD OF THE INVENTION

The present invention relates to a data slicer circuit that slices various data services multiplexed on a video signal.

BACKGROUND OF THE INVENTION

In character multiplex broadcasting, such as closed caption (CC) service, in a vertical blanking interval of a television video signal, digital data in a data packet form is multiplexed. Since the waveform of a multiplexed signal has a binary NRZ (Non-Return-to-Zero) form using pulses, a receiver of the character multiplex broadcasting has to convert the binary NRZ pulses to simple pluses having high and low levels. The receiver therefore has a data slicer circuit for extracting such multiplexed binary NRZ pulses from a television video signal and decoding the pulses to digital data such as character data.

FIG. 8 is a block diagram showing a schematic configuration of a conventional data slicer circuit. This conventional data slicer circuit has the capacitor C10 that receives a television video signal, the clamping circuit 110 having an input terminal connected to the output of the capacitor C10. That is, the clamping circuit 110 receives the video signal by capacitive coupling.

The data slicer circuit also has the differential amplifier 120 having a non-inversion input terminal and an inversion input terminal. Output of the clamping circuit 110 is supplied to the non-inversion input terminal of the differential amplifier 120. Furthermore, output of the clamping circuit 110 is also supplied to the switch SW10. Output of the switch SW10 is supplied to the inversion input terminal of the differential amplifier 120. Furthermore, output of the switch SW10 is also supplied to the capacitor C11. Output of this capacitor C11 is grounded.

The conventional data slicer circuit operates as follows. FIG. 9A and FIG. 9B are timing charts for explaining the operation of the conventional data slicer circuit. A video signal capable of obtaining CC service will be described as an example. In the CC service, a signal synchronized at 503 kHz is multiplexed on line 21 in the vertical blanking interval of the video signal. As shown in FIG. 9A, if the service data is multiplexed on the line 21 in the vertical blanking interval of the video signal, after its synchronization signal, a clock run-in signal is multiplexed and, further, code data constructed by a framing code indicative of the start of service data and information data indicative of service contents follows the clock run-in signal.

The data slicer circuit first clamps the video signal to a pedestal potential with the clamping circuit 110 and detects the synchronization signal. After that, the data slicer circuit generates a timing signal TS, shown in FIG. 9B, in the clock run-in period and turns the switch SW1O on with the timing signal TS. When the switch SW10 turns ON, the capacitor C11 (dotted line in FIG. 9A) is charged with the clock run-in signal, thereby supplying a potential obtained by smoothing the clock run-in signal to the inversion input terminal of the differential amplifier 120. On the other hand, the clamped video signal is input to the non-inversion input terminal of the differential amplifier 120.

The differential amplifier 120 therefore outputs a signal obtained by slicing the video signal by the average potential of the clock run-in signal. In other words, the differential amplifier 120 slices a signal existing in the code data period by using the average potential of the clock run-in signal as a decode potential and outputs resultant data indicative of service information.

In the conventional data slicer circuit, irrespective of whether the clock run-in signal is multiplexed or not, the smoothing operation is always performed by the capacitor C11 when the switch SW10 is turned on in response to the timing signal TS. However, there is consequently a problem in the conventional data slicer circuit that, even if the clock run-in signal is not multiplexed, the potential of the signal in this case is applied to one end of the capacitor C11 and, as a result, the capacitor C11 is discharged. In other words, due to the discharge, the decode potential decreases, and a problem such that a normal decoding process cannot be performed occurs.

As service realized by multiplexing another signal on the video signal, except for the CC service, other services such as ID-1 service (EIAJ, CPX-1204) are known. Particularly, a signal for the CC service is multiplexed as data having an amplitude of 50IRE on the line 21 in the vertical blanking interval. A signal for the ID-1 service is multiplexed as data having an amplitude of 70IRE on line 20 in the vertical blanking interval. These different services can be therefore provided by using the same television video signal.

In the conventional data slicer circuit, however, to simultaneously receive such different services, it is necessary to provide the capacitor C11 for holding the decode potential and the differential amplifier 120 for each service.

SUMMARY OF THE INVENTION

It is an object of this invention to obtain a data slicer circuit capable of stabilizing a decode potential by detecting a clock run-in signal and receiving different services by common components.

The data slicer circuit according to one aspect of this invention comprises a holding unit which holds a pedestal potential of the video signal; an averaging/holding unit which calculates an average potential of signals existing in a period where a reference clock signal of said multiplex signal is present, and holds the calculated average potential; and a comparing unit which compares the potentials held by said averaging/holding unit and holding unit. The comparing unit outputs a detection signal indicative of the presence of the multiplex signal when the potential held by said averaging/holding unit is higher than the potential held by said holding unit.

Thus, the comparing unit can detect whether a multiplex signal of CC service or the like is multiplexed on the video signal. Consequently, a timing of holding a decode potential and the like can be known from the detection signal.

The data slicer circuit according to another aspect of this invention comprises an averaging/holding unit which calculates an average potential of signals existing in a period where a reference clock signal of said multiplex signal is present, and holds the calculated average potential; and a comparing unit which adds (a peak potential of the multiplex signal–pedestal potential of the video signal)/2 to the potential held by said averaging/holding unit to obtain a comparison potential, calculates a difference between a potential of the video signal and the comparison potential, counts the number of clocks based on the difference between the potential of the video signal and the comparison potential. The comparing unit outputs a detection signal indicative of the presence of the multiplex signal when the count reaches to a predetermined value.

Thus, the comparing unit counts the number of clocks of the reference clock signal in the multiplex signal of the CC service or the like on the video signal, and determines the presence/absence of the multiplex signal from the count.

Other objects and features of this invention will become apparent from the following description with reference to the accompanying drawings.

BRIEF DESCRIPTION OF THE DRAWINGS

FIG. 5 is a block diagram showing a schematic configuration of a data slicer circuit according to a fourth embodiment;

FIGS. 6A, 6B, 6C, and 6D are timing charts for explaining the operation of the data slicer circuit according to the fourth embodiment;

DESCRIPTION OF THE PREFERRED EMBODIMENTS

Preferred embodiments of the data slicer circuit according to the invention will be described in detail below with reference to the accompanying drawings. The invention is not limited by the embodiments.

Figure 1:
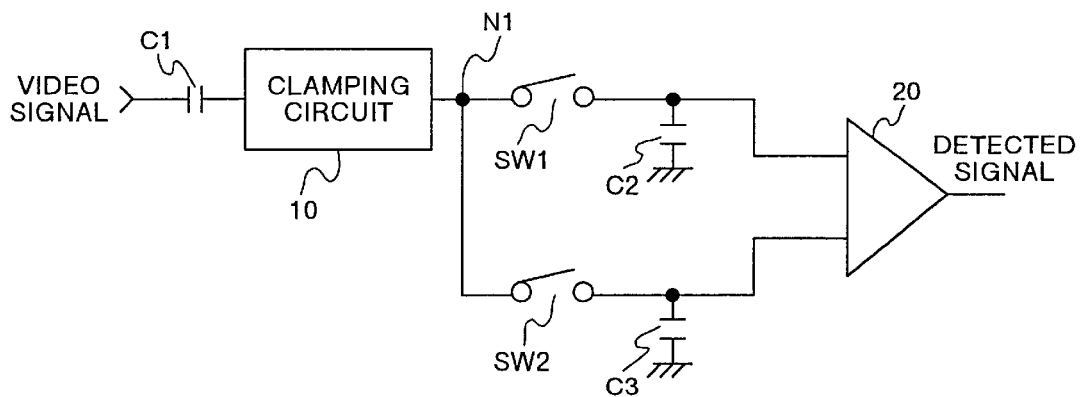
FIG. 1 is a block diagram showing a schematic configuration of a data slicer circuit according to a first embodiment.

The data slicer circuit according to a first embodiment will be described now. FIG. 1 is a block diagram showing a schematic configuration of the data slicer circuit according to the first embodiment. This data slicer circuit has the capacitor C1 that receives the television video signal (video signal). The clamping circuit 10 is connected to the output of the capacitor C1. That is, the clamping circuit 10 receives the video signal by capacitive coupling.

The data slicer circuit also has the comparator 20 having a non-inversion input terminal and an inversion input terminal. The data slicer circuit further includes the switch SW1 connected to the output of the clamping circuit 10. Output of the switch SW1 is supplied to the non-inversion input terminal of the comparator 20. Furthermore, output of the switch SW1 is also supplied to the capacitor C2. Output of this capacitor C2 is grounded. The data slicer circuit further includes the switch SW2 connected to the output of the clamping circuit 10. Output of the switch SW2 is supplied to the inversion input terminal of the comparator 20. Furthermore, output of the switch SW1 is also supplied to the capacitor C3. Output of this capacitor C3 is grounded. Any ordinary differential amplifier may be used as the comparator 20.

Figure 2A:
FIGS. 2A, 2B and 2C are timing charts for explaining the operation of the data slicer circuit according to the first embodiment.
Figure 2B:
Figure 2C:
Figure 9A:
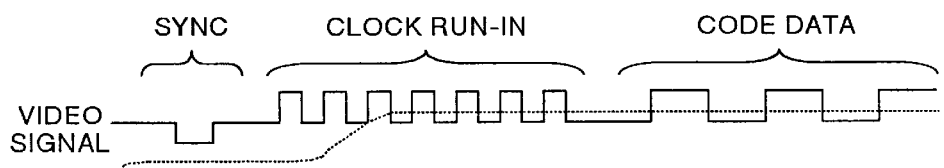
FIG. 9A and FIG. 9B are a timing chart for explaining the operation of the conventional data slicer circuit.
Figure 9B:

The data slicer circuit according to the first embodiment operates as follows. FIG. 2A to FIG. 2C are timing charts for explaining the operation of the data slicer circuit according to the first embodiment. A signal to be multiplexed on the video signal may be either a signal of the CC service or a signal of the ID-1 service. Each of the signals multiplexed by the services has a basic configuration in which, in a manner similar to the example shown in FIG. 9A, a clock run-in signal and code data sequentially follow a sync signal.

The data slicer circuit, first, clamps the video signal to a pedestal potential by the clamping circuit 10 and outputs a clamped signal, that is, a signal converted to a DC potential to the node N1. The data slicer circuit detects a sync signal shown in FIG. 2A and, after that, generates a timing signal TS1 shown in FIG. 2B after elapse of predetermined time since the sync signal and before the clock run-in period. The timing signal TS1 also serves as a drive signal for turning on the switch SW2. In response to the timing signal TS1, the switch SW2 becomes ON. When the switch SW2 becomes ON in response to the timing signal TS1, a signal output from the clamping circuit 10, that is, the pedestal potential is charged in a capacitor C3.

The timing signal TS1 is a signal which is made active only in a predetermined period before the clock run-in period by a one-shot multi-vibrator or the like. The switch SW2 is turned OFF after elapse of the predetermined period. After elapse of a predetermined time since the switch SW2 is turned OFF, at a predetermined timing in the clock run-in period, the data slicer circuit generates a timing signal TS2 shown in FIG. 2C. The timing signal TS2 also serves as a drive signal for turning on the switch SW1. In response to the timing signal TS2, the switch SW1 becomes ON.

When the switch SW1 becomes ON, the capacitor C2 is charged with a signal output from the clamping circuit 10, that is, an average potential of signals in the period in which the clock run-in signal is to be present. In this state, the comparator 20 receives both the pedestal potential charged in the capacitor C3 and the average potential of the signals in the period in which the clock run-in signal charged in the capacitor C2 is to be present, and compares both of the potentials.

When the clock run-in signal actually exists in the period where the clock run-in signal is to be present, the potential of the capacitor C2 is higher than that of the capacitor C3. In the comparator 20, it is set to output a signal indicating that the clock run-in signal is detected when the relation that the potential of the capacitor C2 is higher than that of the capacitor C3 is satisfied, the clock run-in signal can be detected.

As described above, in the data slicer circuit according to the first embodiment, the signal before the clock run-in period is charged in the capacitor C3 to thereby hold the pedestal potential and the signal in the clock run-in period is charged in the capacitor C2 to thereby hold the average potential of the signal in the period. The comparator 20 compares the held pedestal potential and the average potential of the signal in the period in which the clock run-in signal is to be present. Consequently, the presence of the clock run-in signal can be determined in the case where the average potential of the signal in the period where the clock run-in signal is to be present is higher than the pedestal potential.

Thus, the data slicer circuit according to the first embodiment can detect the presence or absence of the clock run-in signal, so that the generation of the decode potential can be controlled according to the result of the detection.

Figure 3:
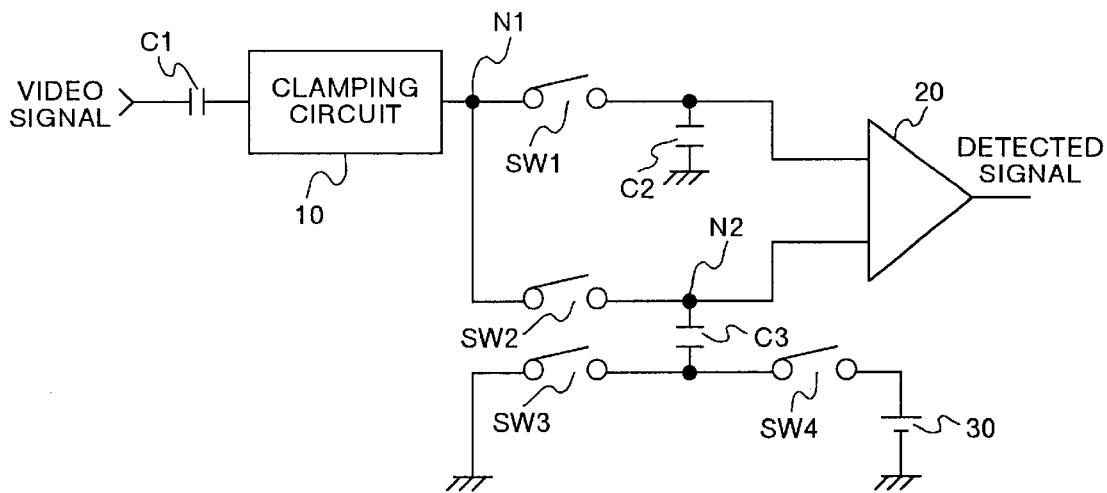
FIG. 3 is a block diagram showing a schematic configuration of a data slicer circuit according to a second embodiment.

The data slicer circuit according to a second embodiment will be described now. FIG. 3 is a block diagram showing a schematic configuration of the data slicer circuit according to the second embodiment. This data slicer circuit has almost the same structure as that of the first embodiment. The difference between the data slicer circuit according to the first embodiment and that according to the second embodiment is that the switches SW3 and SW4 and power source 30 are newly provided in the data slicer circuit according to the second embodiment. The output of the capacitor C3 is connected to the switches SW3 and SW4.

The other terminal of the switch SW3 is grounded. The other terminal of the switch SW4 is connected to the power supply 30. The other terminal of the power supply 30 is grounded. Since the other configuration is similar to that of the first embodiment, the same components are designated by the same reference numerals and their description will not be repeated. The switches SW1 and SW4 operate interlockingly, and the switches SW2 and SW3 operate interlockingly.

The data slicer circuit according to the second embodiment operates as follows. The timing charts shown in FIG. 2A to FIG. 2C will be used to explain the operation. The data slicer circuit according to the second embodiment, first, clamps the video signal to a pedestal potential by the clamping circuit 10 and outputs a clamped signal, that is, a signal converted to a DC potential to the node N1. The data slicer circuit detects a sync signal shown in FIG. 2A and, after elapse of a predetermined time since then and before the clock run-in period, generates a timing signal TS1 shown in FIG. 2B. The timing signal TS1 also serves as a drive signal for turning on the switches SW2 and SW3. In response to the timing signal TS1, the switches SW2 and SW3 becomes ON.

When the switches SW2 and SW3 become ON, one end of the capacitor C3 is connected to the output terminal of the clamping circuit 10, that is, the node N1, and the other end is grounded. Consequently, the capacitor C3 is charged with a signal output from the clamping circuit 10, that is, the pedestal potential. In other words, the switches SW2 and SW3 function as a switching device for detecting the pedestal potential.

The timing signal TS1 is a signal which is made active only in a predetermined period before the clock run-in period. The switches SW2 and SW3 are turned OFF after elapse of the predetermined period. After elapse of a predetermined time since the switches SW2 and SW3 are turned OFF, at a predetermined timing in the clock run-in period, the data slicer circuit generates the timing signal TS2 shown in FIG. 2C. The timing signal TS2 also serves as a drive signal for turning on the switches SW1 and SW4. In response to the timing signal TS2, the switches SW1 and SW4 become ON.

When the switch SW1 becomes ON, the capacitor C2 is charged with an average potential of the signals in the period in which a signal output from the clamping circuit 10, that is, the clock run-in signal is to be present. When the switch SW4 becomes ON, the other end of the capacitor C3 is connected to the positive polarity side of the voltage source 30. As a result, the potential at the node N2 becomes equal to a potential obtained by adding the supply voltage of the voltage source 30 to the pedestal potential charged in the capacitor C3. For example, if the supply voltage of the voltage source 30 is 0.1V, the potential at the node N2 becomes equal to (the pedestal potential+0.1V).

In this state, the comparator 20 receives both the potential at the node N2 and the average potential of the signals in the period where the clock run-in signal charged in the capacitor C2 is to be present, and compares both the potentials.

When the clock run-in signal actually exists in the period where the clock run-in signal is to be present, the potential of the capacitor C2 is higher than that of the capacitor C3. In the comparator 20, by presetting so as to output a signal indicating that the clock run-in signal is detected when the relation that the potential of the capacitor C2 is higher than that of the node N2 is satisfied, the clock run-in signal can be detected.

As described above, in the data slicer circuit according to the second embodiment, the capacitor C3 is charged with the signal before the clock run-in period to thereby hold the pedestal potential and the capacitor C2 is charged with the signal in the clock run-in period to thereby hold the average potential of the signals in the period. The comparator 20 compares a potential obtained by adding the held pedestal potential and the supply voltage of the voltage source 30 with the average potential of the signals in the period in which the clock run-in signal is to be present. Consequently, the presence of the clock run-in signal can be determined in the case where the average potential of the signals in the period where the clock run-in signal is to be present is higher than the potential obtained by adding the pedestal potential and the supply voltage of the voltage source 30.

Particularly, the data slicer circuit according to the second embodiment detects the presence of the clock run-in signal under the condition that the clock run-in signal is at least equal to or higher than the supply voltage of the voltage source. Consequently, the influence of noise or the like can be suppressed and determination accuracy can be improved.

Figure 4:
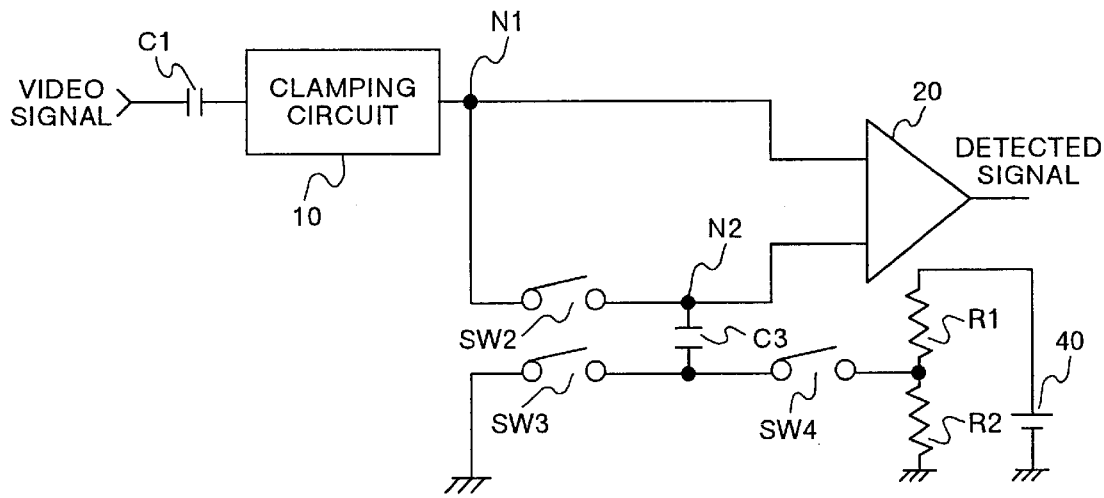
FIG. 4 is a block diagram showing a schematic configuration of a data slicer circuit according to a third embodiment.

The data slicer circuit according to a third embodiment will be described now. FIG. 4 is a block diagram showing a schematic configuration of the data slicer circuit according to the third embodiment. The data slicer circuit according to the third embodiment is almost similar to the the data slicer circuit according to the second embodiment. The difference is that, in data slicer circuit according to the third embodiment, the switch SW1 is not provided, and the output of the clamping circuit 10 is supplied to the comparator 20, furthermore, the resistors R1 and R2 and the voltage source 40 are provided in place of the voltage source 30.

The negative polarity side of the voltage source 40 is grounded, the resistor R1 has one end connected to the positive polarity side of the voltage source 40, and the resistor R2 has one end connected to the other end of the resistor R1 and the other end connected to the ground. Particularly, the voltage source 40 supplies a voltage obtained by subtracting the pedestal potential clamped by the clamping circuit 10 from a predetermined potential as a peak potential of code data. The resistors R1 and R2 function to resistive-divide the supply voltage of the voltage source 40 into tow equal voltages, and the connection point of the resistors R1 and R2 is connected to the other end of the switch SW4.

The data slicer circuit according to the third embodiment operates as follows. The timing charts shown in FIG. 2A to FIG. 2C will be used to explain the operation. The data slicer circuit according to the third embodiment, first, clamps the video signal to a pedestal potential by the clamping circuit 10 and outputs a clamped signal, that is, a signal converted to a DC potential to the node N1. The data slicer circuit detects a sync signal shown in FIG. 2A and, after that, generates a timing signal TS1 shown in FIG. 2B after elapse of a predetermined time since the detection of the sync signal and before the clock run-in period. The timing signal TS1 also serves as a drive signal for turning on the switches SW2 and SW3. In response to the timing signal TS1, the switches SW2 and SW3 become ON.

When the switches SW2 and SW3 become ON, one end of the capacitor C3 is connected to the output terminal of the clamping circuit 10, that is, the node N1, and the other end is grounded. Consequently, the capacitor C3 is charged with a signal output from the clamping circuit 10, that is, the pedestal potential.

The timing signal TS1 is a signal which is made active only in a predetermined period before the clock run-in period. The switches SW2 and SW3 are turned OFF after elapse of the predetermined period. After elapse of a predetermined time since the switches SW2 and SW3 are turned OFF, at a predetermined timing in the clock run-in period, the data slicer circuit generates the timing signal TS2 shown in FIG. 2C. The timing signal TS2 also serves as a drive signal for turning on the switch SW4. In response to the timing signal TS2, the switch SW4 becomes ON.

When the switch SW4 is turned on, the other end of the capacitor C3 is connected to the connection point of the resistors R1 and R2. As a result, the potential at the node N2 becomes equal to a potential obtained by adding (the supply voltage of the voltage source 30)/2, in other words, (data potential−pedestal potential)/2 to the pedestal potential charged in the capacitor C3.

In this state, the comparator 20 receives the potential at the node N2 and continuous signals output from the clamping circuit 10 and compares both of the potentials. By using a differential amplifier as the comparator 20, connecting the node N1 to the non-inversion input terminal, and connecting the node N2 to the inversion input terminal, the decoding operation using the potential at the node N2, that is, the pedestal potential+{(data potential−pedestal potential)/2} as a decode potential can be performed.

As described above, in the data slicer circuit according to the third embodiment, the capacitor C3 is charged with the signal before the clock run-in period to thereby hold the pedestal potential, and the comparator 20 decodes the clock run-in signal by using a potential obtained by adding the held pedestal potential to {(data potential−pedestal potential)/2} as a decode potential at a predetermined timing in the clock run-in period. Consequently, by decoding the clock run-in signal itself and counting the number of clocks of the clock run-in signal, the presence or absence of a multiplexed signal can be determined.

The data slicer circuit according to a fourth embodiment will be described now. FIG. 5 is a block diagram showing a schematic configuration of the data slicer circuit according to the fourth embodiment. In the data slicer circuit according to the fourth embodiment, the data slicer circuit of any of the first to third embodiments is disposed as a multiplex signal detecting circuit and, on the basis of a detection signal output from the multiplex signal detecting circuit, a multiplexed signal is decoded from a video signal.

This data slicer circuit has the multiplex signal detecting circuit 100 which can be replaced by any of the data slicer circuits shown in FIG. 1, FIG. 3, and FIG. 4. Furthermore, the data slicer circuit has the NAND gate 50 to which a detection signal output from the multiplex signal detecting circuit 100 is input to one of input terminals and the timing signal TS3 is input to the other input terminal; a switch SW8 which has one end connected to the node N1 in the multiplex signal detecting circuit 100 and is turned ON/OFF according to an output signal of the NAND gate 50; and the capacitor C5 having one end connected to the other end of the switch SW8 and the other end grounded.

The data slicer circuit also includes a voltage follower 60 having an input terminal connected to one end of the capacitor C5, and a comparator 70 having two input terminals one of which is connected to the output terminal of the voltage follower 60 and the other connected to the node N1 in the multiplex signal detecting circuit 100. In FIG. 5, as the multiplex signal detecting circuit 100, the data slicer circuit having the configuration according to the second embodiment shown in FIG. 3 is shown.

The data slicer circuit according to the fourth embodiment operates as follows. FIG. 6A to FIG. 6D are timing charts for explaining the operation. Since the operation of the multiplex signal detecting circuit 100 is as described in the second embodiment, its description will not be repeated here. The timing charts shown in FIG. 6A to FIG. 6C are the same as those shown in FIG. 2A to FIG. 2C, respectively.

When a detection signal having a logic level H (high) indicating that the presence of a clock run-in signal is determined is output from the multiplex signal detecting circuit 100, as shown in FIG. 6D, the timing signal TS3 has logic level H, and the NAND gate 50 outputs a signal of the logic level H. By the signal of the logic level H, the switch SW8 becomes ON, the potential at the node N1 in the multiplex signal detecting circuit 100, that is, the clock run-in signal potential is averaged and charged in the capacitor C5.

On the other hand, when a detection signal having a logic level L (low) indicating that the absence of the clock run-in signal is determined is output from the multiplex signal detecting circuit 100, the NAND gate 50 outputs a signal at the logic level L, so that the switch SW8 is turned OFF. That is, in this case, the potential of the capacitor C5 charged when the clock run-in signal exists is held.

To the comparator 70, both the potential at the node N1 in the multiplex signal detecting circuit 100 and the potential of the capacitor C5 subjected to impedance conversion via the voltage follower 60 are always input. Consequently, by using the potential of the capacitor C5 as a decode potential, the code data subsequent to the clock run-in signal can be decoded.

As described above, in the data slicer circuit according to the fourth embodiment, any of the data slicer circuits of the first to third embodiments is used as the multiplex signal detecting circuit 100. Only when the detection signal indicative of the presence of the clock run-in signal is output from the multiplex signal detecting circuit 100, the average potential of the clock run-in signal is held as the decode potential, so that an averaging operation with an erroneous decode potential can be suppressed.

Figure 7:
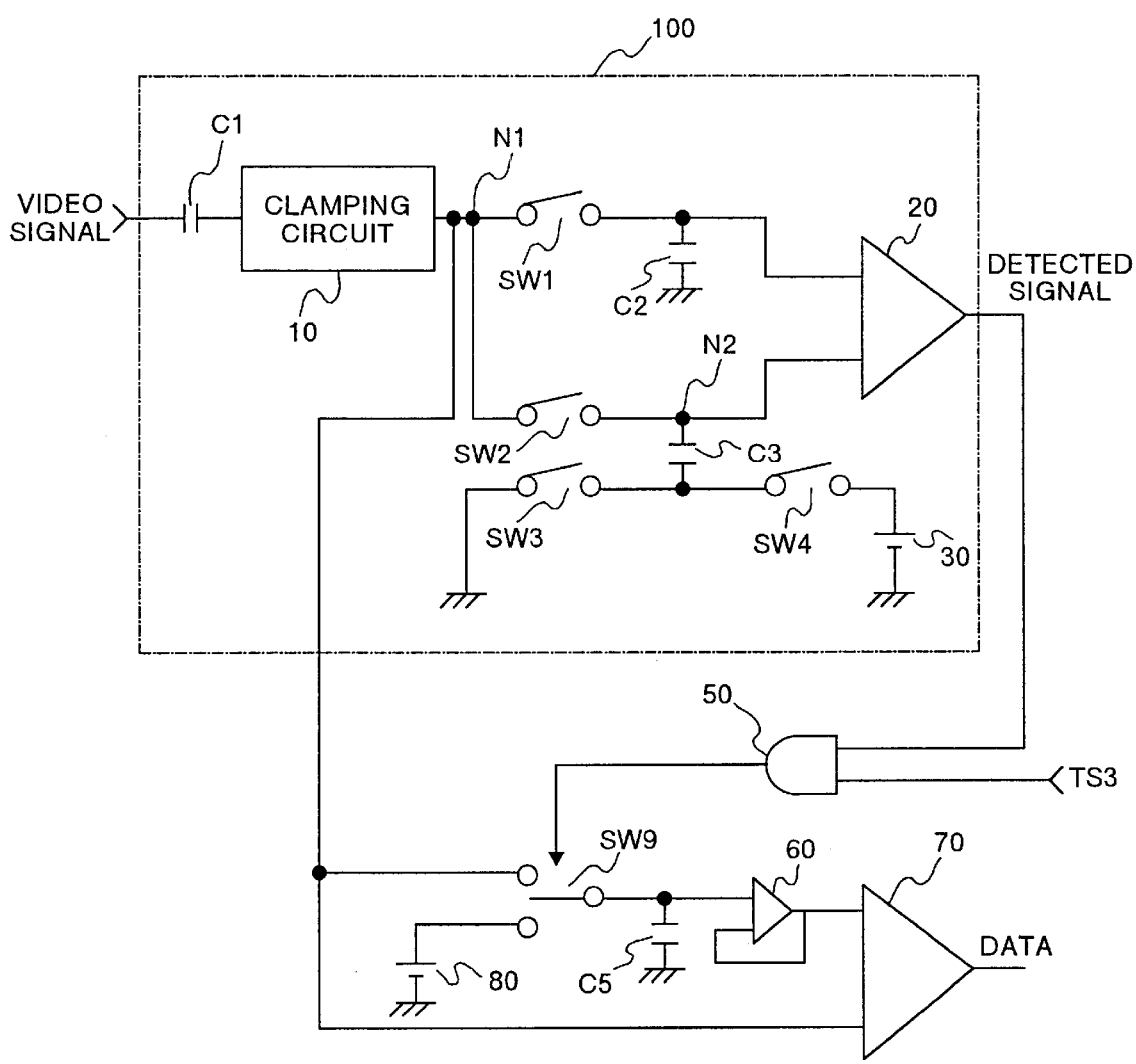
FIG. 7 is a block diagram showing a schematic configuration of a data slicer circuit according to a fifth embodiment.
Figure 8:
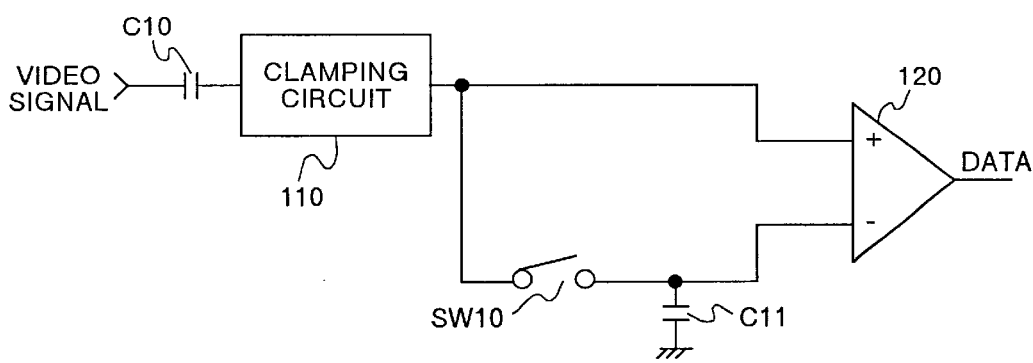
FIG. 8 is a block diagram showing a schematic configuration of a conventional data slicer circuit.

The data slicer circuit according to a fifth embodiment will be described now. FIG. 7 is a block diagram showing a schematic configuration of the data slicer circuit according to the fifth embodiment. In the data slicer circuit according to the fifth embodiment, in place of the switch SW8 shown in FIG. 5, a switch SW9 is provided. The switch SW9 has one end connected to either the node N1 in the multiplex signal detecting circuit 100 or the positive polarity side of a voltage source 80, and the other end connected to one end of the capacitor C5, and is switched according to an output signal of the NAND gate 50.

The operation of the switch SW9 will now be described. Since the other operation is as described in the fourth embodiment, its description will not be repeated. When a detection signal having the logic level H indicating that the presence of the clock run-in signal is determined is output from the multiplex signal detecting circuit 100, one end of the switch SW9 is connected to the node N1 side in the multiplex signal detecting circuit 100 and the switch SW9 operates in a manner similar to the fourth embodiment.

On the other hand, when a detection signal of the logic level L indicating that the absence of the clock run-in signal is determined is output from the multiplex signal detecting circuit 100, the NAND gate 50 outputs a signal of the logic level L and one end of the switch SW9 is connected to the positive polarity side of the voltage source 80. In this case, the capacitor C5 is charged with the supply voltage of the voltage source 80. By setting the supply voltage of the voltage source 80 to around the decode potential, the potential of the capacitor C5 can be always maintained to around the decode potential.

As described above, in the data slicer circuit according to the fifth embodiment, if the absence of the clock run-in signal is determined in the data slicer circuit according to the fourth embodiment, the capacitor C5 is charged with a voltage around the decode potential. The charging operation on the capacitor C5 in the case where the presence of the clock run-in signal is determined is therefore performed at high speed, and the potential of the capacitor C5 can be immediately used as a stable decode potential.

In the foregoing fifth embodiment, in place of the voltage source 80, it is also possible to provide a voltage source capable of providing a plurality of different voltage supply points and control the potential to be selected by the switch SW9 so as to be changed according to, for example, the IRE amplitude of the clock run-in signal. Particularly, since the data amplitude of the CC service and that of the ID-1 service are 50IRE and 70IRE, respectively, and are different from each other, at the time of determination of the absence of the clock run-in signal, the capacitor C5 can be preliminarily charged with the potential according to the specification of any of the services. That is, data slicing adapted to various video signal sources can be performed.

Further, in this case, by preliminarily detecting the potential charged in the capacitor C5 at the time of determination of the presence of the clock run-in signal by an AD converter or the like, for example, a voltage supply point closest to the detected potential may be selected by the switch SW9.

As described above, according to the invention, whether a multiplex signal of CC service or the like is multiplexed on a video signal or not can be detected by the comparing unit. Consequently, a timing of holding a decode potential and the like can be known from the detection signal. An effect such that the data slicing process can be executed by using the stable decode potential is produced.

Furthermore, as a condition of detecting the multiplex signal, a predetermined potential or higher can be required for the video signal to be detected. Therefore, an effect such that a video signal which becomes unstable due to noise or the like is prevented from being erroneously detected as a multiplex signal is produced.

Furthermore, the number of clocks of the reference clock signal in the multiplex signal of the CC service or the like on the video signal is counted by the comparing unit, and the presence/absence of the multiplex signal can be determined on the basis of the count value, so that the multiplex signal can be detected more strictly. Thus, an effect such that the reliability of detection can be improved is produced.

Furthermore, according to the presence/absence of the multiplex signal, the decode potential can be held at a proper timing. Thus, an effect such that the data slicing process can be executed by using a stable decode potential is produced.

Furthermore, when the multiplex signal is not detected, a predetermined potential can be held as a decode potential, so that the time required to assure the inherent decode potential can be shortened. Consequently, an effect such that the high-speed data slicing process can be realized is produced.

Furthermore, when the multiplex signal is not detected, a potential according to any of the plurality of kinds of multiplex signals is held. The time required to assure the inherent decode potential can be therefore shortened. Thus, an effect such that the high-speed data slicing process can be realized and a plurality of different services can be received is produced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data slicer circuit that decodes a received multiplex signal, the multiplex signal being signal multiplexed on a video signal, by performing a slicing operation with a decode potential, said data slicer circuit comprising:

a holding unit which holds a pedestal potential of the video signal;

an averaging/holding unit which calculates an average potential of signals existing in a period where a reference clock signal of the multiplex signal is present, and holds the average potential calculated; and a comparing unit which compares the potentials held by said averaging/holding unit and said holding unit, and outputs a first detection signal, indicative of presence of the multiplex signal, when the potential held by said averaging/holding unit is higher than the potential held by said holding unit.

2. The data slicer circuit according to claim 1, further comprising a potential adder which adds a potential to the potential held by said holding unit and produces an output, wherein said comparing unit compares the potentials held by said averaging/holding unit and the output of said potential adder.

3. The data slicer circuit according to claim 1, further comprising a decode potential averaging/holding unit which calculates an average potential of the reference clock signal of the multiplex signal and holds the average potential calculated as the decode potential when said comparing unit outputs a second detection signal, indicative of absence of the multiplex signal.

4. The data slicer circuit according to claim 3, wherein said decode potential averaging/holding unit holds a fixed potential when said comparing unit outputs the second detection signal.

5. The data slicer circuit according to claim 3, wherein a plurality of different kinds of multiplex signals are multiplexed on the video signal and, when said comparing unit outputs the second detection, and said decode potential averaging/holding unit holds a potential which varies according to the type of the multiplex signal.

6. A data slicer circuit that decodes received multiplex signal, the multiplex signal being signal multiplexed on a video signal, by performing a slicing operation with a decode potential, said data slicer circuit comprising:

an averaging/holding unit which calculates an average potential of signals existing in a period when a reference clock signal of the multiplex signal is present, and holds the average potential calculated; and a comparing unit which adds one half the difference between a peak potential of the multiplex signal and a pedestal potential of the video signal to the potential held by said averaging/holding unit to obtain a comparison potential, calculates a difference between a potential of the video signal and the comparison potential, counts a number of clocks as a count, based on the difference between the potential of the video signal and the comparison potential, and outputs a first detection signal, indicative of the presence of the multiplex signal, when the count reaches to a threshold value.

7. The data slicer circuit according to claim 6, further comprising a decode potential averaging/holding unit which calculates an average potential of the reference clock signal of the multiplex signal and holds the average potential as the decode potential calculated when said comparing unit outputs a second detection, signal indicative of absence of the multiplex signal.

8. The data slicer circuit according to claim 7, wherein said decode potential averaging/holding unit holds a fixed potential when said comparing unit outputs the second detection signal.

9. The data slicer circuit according to claim 7, wherein a plurality of different kinds of multiplex signals are multiplexed on the video signal and, when said comparing unit outputs the second detection signal, said decode potential averaging/holding unit holds a potential which varies according to the kind of the multiplex signal.

* * * * *